Nov. 21, 1939.   A. E. BOWEN   2,180,950
GUIDED WAVE TRANSMISSION
Filed March 30, 1937   7 Sheets-Sheet 1

$\left(\dfrac{\lambda_a}{d}\right)_c^{H_{11}} = 1.706$ $\left(\dfrac{\lambda_a}{d}\right)_c^{E_{01}} = 1.306$ $\left(\dfrac{\lambda_a}{d}\right)_c^{H_{21}} = 1.029$ $\left(\dfrac{\lambda_a}{d}\right)_c^{H_{01}} = 0.821$ $\left(\dfrac{\lambda_a}{d}\right)_c^{E_{11}} = 0.821$ $\left(\dfrac{\lambda_a}{d}\right)_c^{H_{31}} = 0.748$ INVENTOR
A. E. BOWEN
BY
*H. A. Burgess*
ATTORNEY

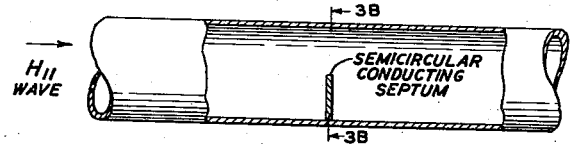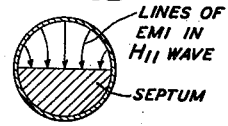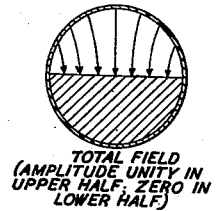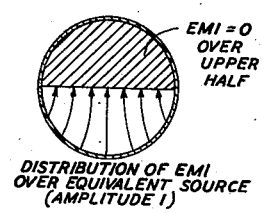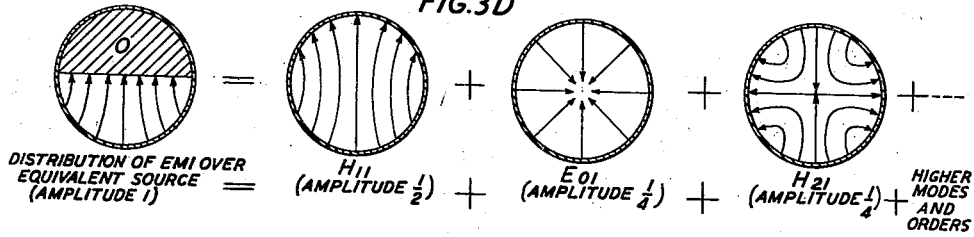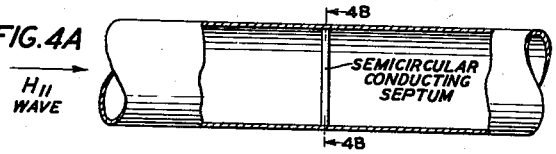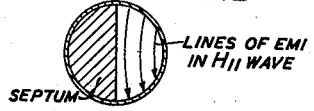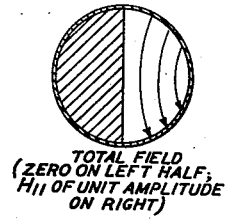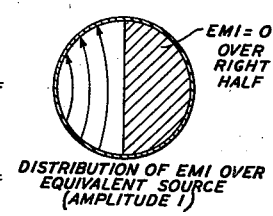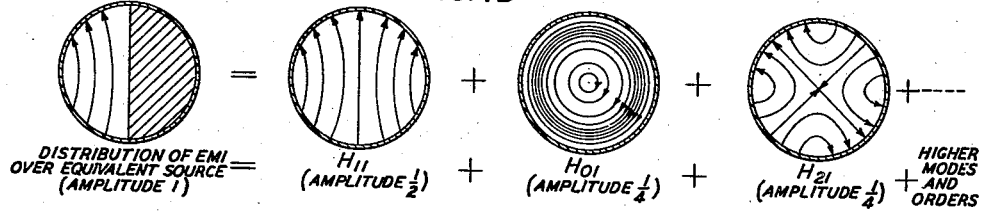

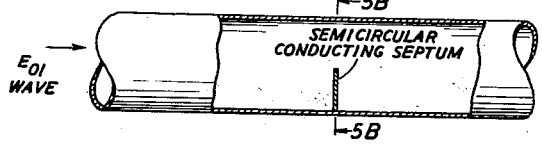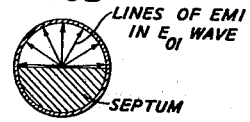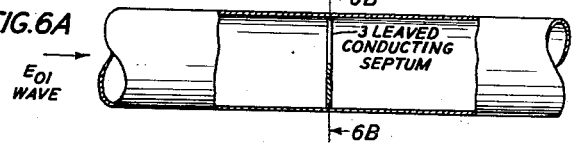

Nov. 21, 1939.    A. E. BOWEN    2,180,950
GUIDED WAVE TRANSMISSION
Filed March 30, 1937    7 Sheets-Sheet 4
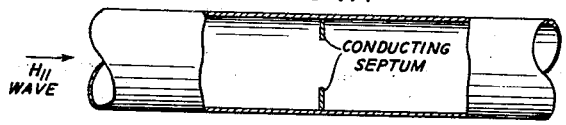
FIG. 7A
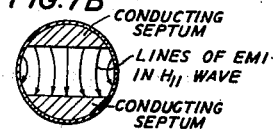
FIG. 7B
FIG. 7C
FIG. 7D
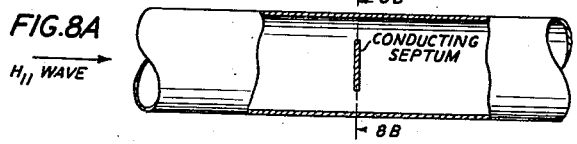
FIG. 8A
FIG. 8B
FIG. 8C
FIG. 8D
INVENTOR
A. E. BOWEN
BY
ATTORNEY

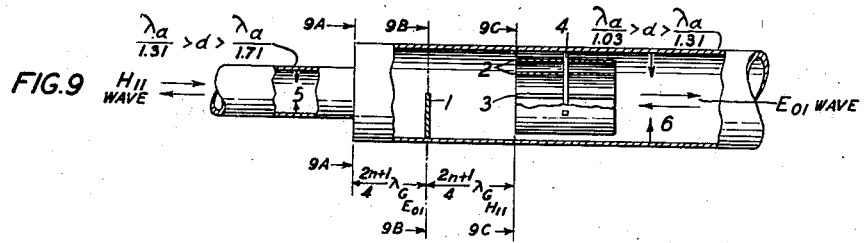
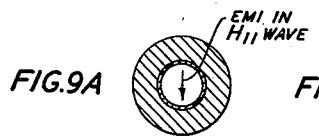  
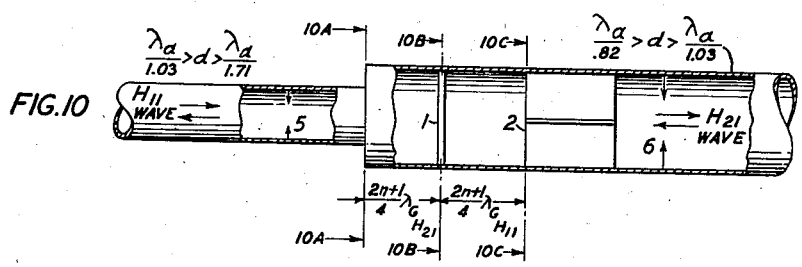
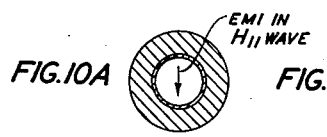  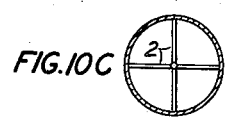
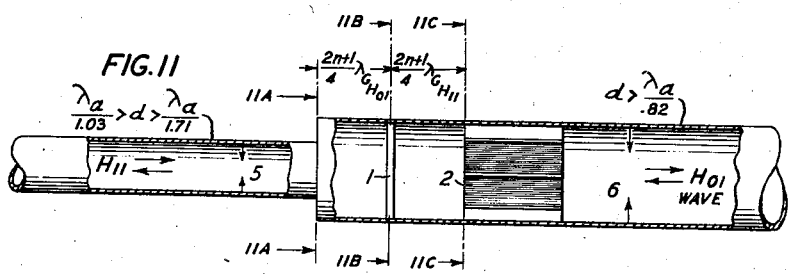
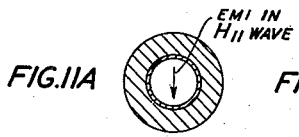  

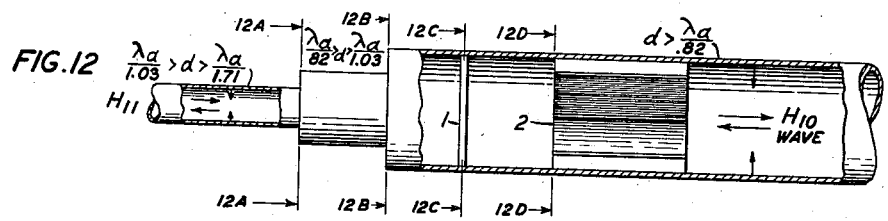
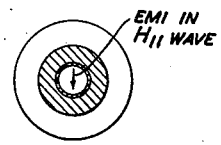 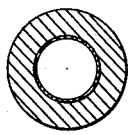 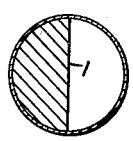 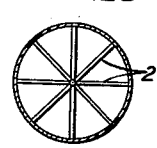
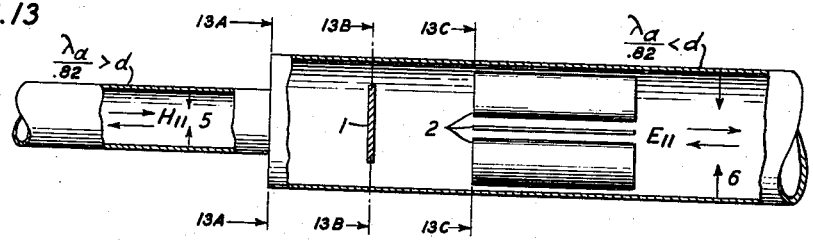
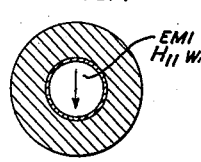 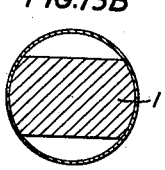 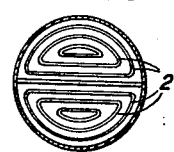
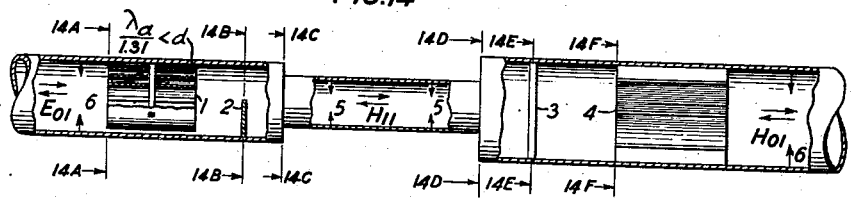
    

Nov. 21, 1939.    A. E. BOWEN    2,180,950
GUIDED WAVE TRANSMISSION
Filed March 30, 1937    7 Sheets-Sheet 7

INVENTOR
A. E. BOWEN
BY
ATTORNEY

Patented Nov. 21, 1939

2,180,950

UNITED STATES PATENT OFFICE 2,180,950

GUIDED WAVE TRANSMISSION

Arnold E. Bowen, Red Bank, N. J., assignor to Bell Telephone Laboratories, Incorporated, New York, N. Y., a corporation of New York Application March 30, 1937, Serial No. 133,810

36 Claims. (Cl. 178—44)

The present invention relates to wave transmission systems, more particularly to systems utilizing dielectrically guided waves, and it is concerned principally, but in its broader aspects not exclusively, with the conversion of dielectrically guided waves from one type to another.

Dielectric guide systems of various kinds have been described in some detail heretofore in such United States patents as G. C. Southworth No. 2,129,711, No. 2,129,712 and No. 2,129,714, all issued September 13, 1938, and S. A. Schelkunoff No. 2,147,717, issued February 21, 1939, and in the papers by J. R. Carson et al. and S. A. Schelkunoff appearing in the April 1936 issue of the Bell System Technical Journal. The dielectric guide itself has taken a wide variety of forms, but typical of guides disclosed heretofore is one consisting of a rod of dielectric material and another consisting essentially of a metallic pipe containing a solid or gaseous dielectric medium.

A form of dielectric guide that lends itself well to the purposes in hand is one consisting of a metallic pipe, evacuated or filled with air, and it is in terms of such a guide that my invention will be described. It is to be understood, however, that this is for illustrative purposes only and that the invention is not to be limited to this specific form of guide.

Dielectrically guided wave transmission as disclosed in the references cited above, is unique in several respects. In the first place it is evident that the provision of separate conducting paths for the go-and-return flow of conduction current is not an essential characteristic whereas in conventional guided wave systems known heretofore it is. Secondly, in each instance it has been observed that the guide presents the attenuation characteristic of a high-pass filter, that is, there is a certain critical or cut-off frequency separating the propagation range from a lower frequency range of zero or highly attenuated transmission. Moreover, it has been found that the critical frequency and the phase velocity of dielectrically guided waves are both functions of the transverse dimensions of the guide.

Dielectrically guided waves, as will more fully appear on further reading of this specification, are capable of transmission in an indefinitely large number of forms or types, each type being distinguished by the characteristic spacial distribution and inter-relation of the component electric and magnetic fields comprising the waves, and each type differs specifically from other types in certain transmission characteristics that are important with respect to the objects of this invention.

Under certain conditions it may be desirable for one reason or another to generate and propagate dielectrically guided waves of one type and at one point or another in the guide to convert these waves into waves of another type. The present invention relates primarily to methods and means for effecting such conversion of wave type.

One object is to provide means by which any given type of wave may be converted into another type and this type again converted back to the original type or to still other types in such manner and at such points as the particular situation may make desirable.

A further object is to permit the generation of a type of wave which is especially favorable from a generation point of view, and its conversion into a type which is especially favorable from a propagation point of view.

Still another purpose is to convert a type favorable for propagation to a type especially favorable for amplification, modulation or demodulation, and to again convert it into a type favorable for propagation or reception.

Still a further object relates to a situation where the guide may be made up of two or more sections of different nature or dimensions. Provision is made for conversion, at or near the point of change in nature, from the type present in one section to a type suitable for the next section.

Other features of my invention relate to forms of discontinuities or barriers or baffles associated with the wave guide and to the combination therewith of selective means whereby certain desired transformations are consummated.

Still other features of my invention will appear in the following description.

Although as hereinbefore noted, there are an indefinite number of types of dielectrically guided waves, it has been found that they fall into either of two broad classes. In the one class, assuming now for the sake of simplicity that the guide is in the form of a metallic tube, the electric component of the wave is transverse to the tube and at no point does it have a longitudinal component excepting as the tube is not quite a perfect conductor. The magnetic component, on the other hand, has both transverse and longitudinal components. This class will be designated as "transverse electric" waves or TE waves. In the other class, the magnetic component is transverse to the tube and at no point does it have a longitudinal component, but the electric component has in general both transverse and longitudinal components. This class will be designated as "transverse magnetic" waves or TM waves.

The various possible types of dielectrically guided waves in each of these two classes may be identified and distinguished from each other by their order and by their mode of propagation. The order of the wave is determined by the manner in which the field intensity varies circumferentially around the axis of the guide, whereas the mode is determined by the manner of its variation with radial distance from the axis of the guide. Reference is made here to the Schelkunoff patent, supra, for a more complete discussion of this matter of mode and order. The usual convention is herein adopted of designating a TE wave by $H_{nm}$, where $n$ represents the order and $m$ the mode. Similarly a TM wave of the $n$th order and $m$th mode will be represented by $E_{nm}$.

The invention will be better understood by reference to the following detailed specification and to the accompanying drawings in which:

Figs. 1A to 1F give representations of some of the simpler forms of waves as they may exist inside a hollow cylindrical conductor;

Fig. 3A is a longitudinal section of a guide with a semicircular barrier or baffle and Fig. 3B is a cross-section through the baffle of Fig. 3A. Figs. 3C and 3D relate to the analysis of the conditions in the guide of Fig. 3A;

Figs. 4A to 8D show baffles and the analysis and derivation of sources equivalent to these baffles;

Fig. 9 shows a converter for converting from an $H_{11}$ wave to an $E_{01}$ wave, and Figs. 9A to 9C are cross-sectional views thereof;

Figs. 10 to 13 are modified forms of converters shown in cross-section in Figs. 10A to 10C, 11A to 11C, 12A to 12D, and 13A to 13C, respectively;

Figs. 14 and 14A to 14F, Fig. 15 and Fig. 16 illustrate three systems embodying two converters for specific purposes.

Referring more particularly to Figs. 1A to 1F, the diagrams show the distribution of electromotive intensity (E. M. I.) in the wave fronts of some of the simpler types of waves which can exist inside a hollow cylindrical conductor. To avoid confusion the lines of magnetomotive intensity are not shown. As mentioned heretofore, there is for each type of wave in any particular dielectric guide a certain critical or cut-off frequency below which a wave of that type cannot be propagated in that guide. Where the guide is a metallic tube and the enclosed dielectric medium has a dielectric coefficient of substantially unity, the cut-off frequency for a particular type of wave is determined by and simply related to the internal diameter $d$ of the tube. If instead of frequency we use the corresponding free space wavelength $\lambda_a$ then the magnitude of the ratio $(\lambda_a/d)$ indicates whether or not a particular type of wave can be propagated within the guide at a particular frequency under consideration. Thus, for example, the ratio $(\lambda_a/d)$ must not exceed 0.821 if an $H_{01}$ wave is to be produced, for $(\lambda_a/d)_c = 0.821$ expresses the relation existing at cut-off. In Figs. 1A to 1F various types of waves are represented in the order in which the critical ratio $(\lambda_a/d)_c$ decreases, or in other words, in the order in which these types might appear as the operating frequency is progressively increased. If the operating frequency and the diameter are such that $(\lambda_a/d)$ is between 1.706 and 1.306, only an $H_{11}$ wave can be maintained; if $(\lambda^a/d)$ is less than 1.306, $H_{11}$ and $E_{01}$ waves can exist simultaneously, and so on. For a given free space wave-length $\lambda_a$ and diameter of the guide $d$ the guide will propagate all modes and orders of waves for which the cut-off ratio is greater than the given $(\lambda_a/d)$.

Figure 2A:
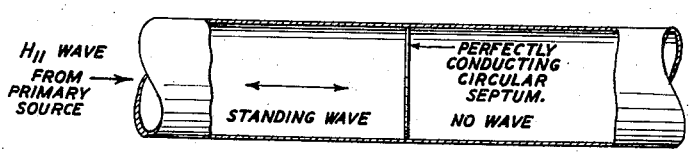
Fig. 2A shows a guide with a conducting barrier or baffle extending over its cross-section and Figs. 2B and 2C relate to the analysis of the conditions in the guide of Fig. 2A.
Figure 2B:
Figure 2C:
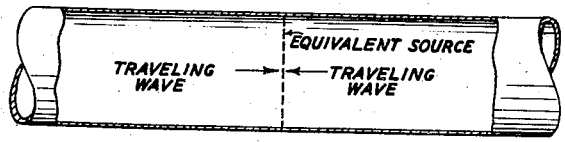

A substantial aid to the understanding of the invention is provided by the so-called induction theorem and by the principle of superposition. For the purposes of this invention, the former may be stated in the following words: "If a conducting body is placed in an electromagnetic field generated by some source or sources the resultant field can be calculated by replacing the conducting body by an additional source, the currents in this source being (theoretically) calculable if the original field is known." A simple application of this theorem is illustrated in Figs. 2A to 2C. In a hollow conducting wave guide an electromagnetic wave proceeding from left to right meets a perfectly conducting sheet extending over the whole cross-section of the guide. We note that the wave is reflected by the sheet so that in the guide to the left there is a standing wave and to the right there is no disturbance; but let us now replace the conducting sheet by a generator with a distribution of electromotive intensity in the plane of the sheet exactly opposite to that of the original field (the field which would exist in the absence of the sheet). This generator sends an electromagnetic wave in both directions as shown in Fig. 2C; to the right the field due to it equals in magnitude but is exactly opposite in phase to the original field of Fig. 2B so that they cancel; to the left the field due to it equals in magnitude and is in phase with the original field so that a standing wave is produced.

The principle of superposition is embodied in this statement: "In a linear system containing any distribution of sources the resultant disturbance at any point is the sum of the disturbances which would be produced by the sources taken singly or in any combination." This principle is well known; it may be pointed out that it was implied in the discussion of Fig. 2A where the resultant wave was considered to be the sum of the original wave (due to sources far to the left in the guide) and of the wave due to the equivalent, virtual or fictitious source at the location of the conducting sheet.

With these facts in mind, we may proceed with a discussion of converters. Suppose as illustrated in Fig. 3A we have in a cylindrical wave guide an $H_{11}$ wave proceeding from the left and interposed in its path a semicircular metallic septum of high conductivity, of copper, for example, oriented as shown in Fig. 3B. The septum can be considered as a new source of waves and the total field is obtained by combining the field from it with the original field. At the location of the septum the original field is an $H_{11}$ field, the total field is something which is zero over the surface of the septum and (approximately) an $H_{11}$ field over the open half of the guide, so that the source equivalent to the septum can be found approximately by finding (total field) - (original field). An exact formulation and solution of this equation even for so simple a septum as that under discussion would be very difficult, but physical reasoning will take us as far as we need to go. The procedure is as follows:

We start with a picture of the lines of electromotive intensity (E. M. I.) of the total field (Fig. 3C) and subtract from it an $H_{11}$ field of amplitude unity (rating the amplitude of the field in the upper half of the total field as unity). We are then left the peculiar field to the right in Fig. 3C representing the distribution of electromotive intensity in the source equivalent to the septum. In Fig. 3D the series of four circles shows a qualitative decomposition of this distribution into patterns corresponding to those of the elementary wave forms pictured in Figs. 1A to 1F. Among the first few wave forms it is apparent that $H_{11}$ of amplitude one-half, and $E_{01}$ and $H_{21}$ each of amplitude one-quarter, when superposed add up practically to the distribution of electromotive intensity over the equivalent source. This is most easily seen by superposing vectors along four radii. Thus on the horizontal radii the outwardly directed electromotive intensities in the $H_{21}$ pattern are approximately neutralized by the inwardly directed electromotive intensities of the $E_{01}$ pattern; the horizontal electromotive intensity in the $H_{11}$ component is zero so that when the three patterns are superposed the horizontal electromotive intensity is zero, as it was in the equivalent or fictitious source. In the upper half of the diagrams, the downwardly directed electromotive intensities in the $E_{01}$ and $H_{21}$ patterns add up to amplitude one-half; this is neutralized by the upward electromotive intensity in the $H_{11}$ pattern, leaving a net electromotive intensity of zero in the upper half, as it was in the equivalent source. Finally in the lower half the electromotive intensities in the $H_{11}$, $E_{01}$ and $H_{21}$ patterns are all directed upwards leading to an electromotive intensity of unity in this half, as it was in the equivalent source. Thus we have shown in a rough way that inserting a properly oriented semicircular septum in the path of an $H_{11}$ wave is equivalent to inserting sources of $H_{11}$, $E_{01}$ and $H_{21}$ waves at the location of the septum. It should be pointed out that the values given for the amplitudes are upper limits. Actually the three wave patterns shown will not quite add up to equal the electromotive intensity in the equivalent source, so that there are components corresponding to waves of higher orders and modes, but for the case under consideration these will be small.

Figs. 4A to 8D show the derivation of sources equivalent to several other kinds of conducting baffles in a guide. Thus Figs. 4A and 4B show the semicircular baffle of Fig. 3A when rotated 90 degrees. Fig. 4C shows that (total field)-(original field) in this case is a generator with a distribution of electromotive intensity shown at the right-hand side of Fig. 4C. This upon analysis, as in Fig. 4D, turns out to be made up of components of equivalent fictitious generators of an $H_{11}$ wave of amplitude one-half, an $H_{01}$ wave of amplitude one-quarter and an $H_{21}$ wave of amplitude one-quarter. In addition there will be equivalent generators of higher modes and orders, but of such small amplitude that they may be neglected for the purposes of our considerations.

The nature of the waves generated by the equivalent or fictitious source will, of course, depend on the nature or type of the incident wave. This is illustrated in Figs. 5A to 5D in which a wave guide with a semicircular conducting septum in the lower half, precisely as in Fig. 3A, is used, but in which the incident wave is of the $E_{01}$ type. Fig. 5B shows the total field as modified by the baffle. By the same form of analysis as before, Fig. 5C shows what the distribution of electromotive intensity over the equivalent source should be, and Fig. 5D shows on analysis that the distribution is equivalent to an $E_{01}$, and $H_{11}$ and an $H_{21}$ component plus weak higher modes and orders. A similar correspondence would be shown for this guide if the incident wave were in $H_{01}$ wave. Analysis would show it to be equivalent to sources of $H_{01}$, $H_{11}$ and $H_{21}$ waves. In general, if when acted upon a wave of type X a septum is equivalent, among other things, to a source of wave type Y, then the same septum when acted upon by wave type Y is equivalent, among other things, to a source of wave type X.

Figs. 6A and 6B show a baffle with three 60-degree leaves inserted in a guide carrying an $E_{01}$ wave. The analysis presented in Figs. 6C and 6D shows that the baffle is equivalent to sources of $E_{01}$ and $H_{31}$ waves. Further extension of the analysis of this type of baffle would show that in general an $n$ leaved sector in the presence of an $E_{01}$ wave would serve as a source of $E_{01}$ and $H_{n1}$ waves.

Figs. 7A and 7B are longitudinal and transverse sections of a guide carrying an $H_{11}$ wave and having a two-part metallic septum consisting of two polar zones. The analysis presented in Figs. 7C and 7D shows that the combination is equivalent to sources of $H_{11}$ and $E_{11}$ waves.

Figs. 8A and 8B show longitudinal and transverse sections of a guide having a septum which may be termed complementary to that of Figs. 7A and 7B and which consists of an equatorial zone or band. Analysis shows, as indicated in Figs. 8C and 8D that it has the same set of equivalent sources.

Other types of baffles could be described but sufficient disclosure has been made to show their general properties. Such baffles together with the cut-off characteristics of wave guides and gratings which discriminate between waves supply an array of material with which apparatus suitable for conversion from one wave type to another can be assembled. Typical illustrative converters are now to be described.

In Figs. 9 to 9C there is shown a converter suitable for converting from an $H_{11}$ wave to an $E_{01}$ wave or vice versa. Fig. 9 is a longitudinal section of the wave guide and Figs. 9A to 9C are transverse sections of the guide on the lines A—A, B—B and C—C, respectively. When $H_{11}$ waves are to be converted, the wave enters the system through the smaller guide on the left and impinges on the semicircular septum 1. As shown in Fig. 3D, this septum is equivalent to a source of $H_{11}$, $E_{01}$ and $H_{21}$ waves. The section containing the septum is here made of a diameter less than $$\frac{\lambda_a}{1.03}$$

Consequently neither section of the guide will conduct energy away from the $H_{21}$ equivalent or fictitious source and the fields due to this source are therefore confined to the immediate vicinity of the septum. However, the diameter of the larger section is also chosen to be greater than $$\frac{\lambda_a}{1.31}$$

Consequently, $E_{01}$ waves can be propagated so that the equivalent source of $E_{01}$ waves can deliver energy to the field in the guide. To the left the $E_{01}$ wave can progress to the section A—A where, however, it is reflected since the guide to the left of A—A is chosen as too small to transmit an $E_{01}$ wave. If then the distance from the septum to A—A is made equal to an odd number of quarter wave-lengths of the $E_{01}$ wave, the reflected wave arrives back at the location of the septum in such phase as to reinforce the $E_{01}$ wave progressing to the right. This feature of reflection of desired phase is fully described in the patents of Southworth to which reference has been made above. In passing to the right the $E_{01}$ wave meets the discriminator or grating 2, 3 consisting of a central conductor 3 and a series of coaxial conductors 2 supported centrally by the wave guide in any appropriately suitable manner, such as by insulating material 4. If the walls of the cylinders 2 are thin and their radii so chosen that the characteristic impedances of the successive coaxials formed by the assemblage are equal, then the grating will pass the $E_{01}$ waves freely and these waves will pass out of the system to the right.

It is to be noted that if the diameter of the guide at B—B is large enough to pass the $E_{01}$ wave it will also pass the $H_{11}$ wave and we must, therefore, consider what will happen to the two $H_{11}$ waves, the one proceeding from the actual source and the other proceeding from the virtual source located at the septum. The grating 2, 3 constitutes a bar to the passage of an $H_{11}$ wave beyond C—C, as explained in the Southworth Patent No. 2,129,714 noted above. Consequently the wave from the actual source is reflected at C—C and a standing wave extending from the real source to C—C is the result. We may recall that a standing wave system is equivalent to two traveling wave systems of equal amplitude traveling in opposite directions. However, there must be added to the incident wave the $H_{11}$ wave proceeding from the virtual source at the septum. Fig. 3D shows that the electromotive intensity distribution in this is opposite to that in the original or incident wave and of one-half its amplitude. If the grating surface C—C is distant one-quarter wave-length of an $H_{11}$ wave from the septum, it will be evident that the wave proceeding from the virtual source (taking into consideration the part reflected from the grating) is just such as will cancel the reflected portion of the original wave. The spacing is indicated in Fig. 9, where $\lambda_G$ indicates the length of the waves within the guide and the subscripts $E_{01}$ and $H_{11}$ identify the wave types. Thus we see that from the left a traveling wave of $H_{11}$ type proceeds into the converter chamber, where, except for incidental losses arising from the fact that the converter elements are not perfect conductors, its energy tends to build up or accumulate except as it is converted into a wave which can proceed out of the chamber, namely, an $E_{01}$ wave which proceeds to the right. In Fig. 9 variable irises 5 and 6 are introduced to compensate for small reactances due to, for instance, the change in diameter at A—A. Such use of irises is explained in Patent No. 2,151,118, issued March 21, 1939, to A. P. King et al.

It was stated above that a certain relationship among the diameters of the coaxial sections constituting the grating is desirable. This may be explained as follows: Arriving at the front face of the grating, the lines of electromotive intensity attach themselves to the cylindrical conductors. They then proceed through the grating as waves on coaxial conductors and at the back face they detach themselves and continue as an $E_{01}$ wave. Now the characteristic impedance of a coaxial varies as the ratio of diameter of the outer and inner conductors; then designating the diameter of three consecutive cylinders by $d_n+1$, $d_n$ and $d_n-1$, it is seen that if $$\frac{d_n+1}{d_n} = \frac{d_n}{d_n-1}$$

the characteristic impedance of the coaxial formed of cylinders $n+1$ and $n$ will be the same as that for the coaxial formed of cylinders $n$ and $n-1$ and the two coaxials will share the wave equitably between themselves and with the other coaxial members.

Since the grating shown in Fig. 9 will also prevent the passage of an $H_{21}$ wave from the converting chamber into the guide to the right, it is not necessary that the diameter of the converting chamber be such as to suppress the $H_{21}$ wave. It is, however, a matter of convenience and extra precaution to make it so.

Fig. 10 shows how by an increase in diameter of the converting chamber to a point where it will support an $H_{21}$ wave and by a change in the type of grating the semicircular septum may be used as an $H_{11} \rightleftarrows H_{21}$ converter. The notation $\rightleftarrows$ is used to indicate that the converter will work in either direction converting $H_{11}$ to $H_{21}$ or vice versa. As has already been pointed out in connection with Fig. 4D, the semicircular septum acted upon by an $H_{11}$ wave serves among other things as a virtual source giving an $H_{21}$ wave. By changing the form of the grating 2 of Fig. 9 into one consisting of two diametral conducting planes oriented to lie along lines of zero electromotive intensity in the $H_{21}$ wave shown in Fig. 4D, this may be accomplished. Such a grating if made a wave-length or so in length will not pass either the $H_{11}$ or $E_{01}$ components but will pass the $H_{21}$ wave without impediment. The septum and grating are spaced according to the principles discussed with reference to Fig. 9.

Figs. 11 to 11C show a converter for $H_{11} \rightleftarrows H_{01}$ conversion. This converter differs from that of Fig. 10 in two respects: (a) the grating consists of four diametral planes at 45-degree angles to each other and thus prevents transmission of the $H_{21}$ wave, (b) the diameter of the guide in the portion to the right of A—A is enlarged sufficiently so that it will sustain the $H_{01}$ component which had been suppressed in the arrangement of Fig. 10. In the figure the distance from A—A to B—B is approximately an odd number of quarter wave-lengths of the $H_{01}$ wave and from B—B to C—C approximately an odd number of quarter wave-lengths of the $H_{11}$ wave. If it were not for the fact that the septum is also a virtual source of $H_{21}$ wave, it would be immaterial whether these intervals were one-quarter, three-quarter, five-quarter wave-lengths, etc. However, in the presence of the $H_{21}$ source, it is advisable to choose these distances such as to make them as far as possible from an integral number of half wave-lengths of the $H_{21}$ wave. If either or both of these distances approach a half wave-length of $H_{21}$, resonance may establish large amplitudes of $H_{21}$ waves between the virtual source and surfaces A—A and C—C, with a consequent loss of power in the converter. The grating 2 may have any number of diametrally conducting planes upwards from the number shown, but must not have less.

A modification of Fig. 11, which is also applicable to Fig. 10, is shown in Figs. 12 to 12D. This converter differs from Fig. 11 in the insertion of a section from A—A to B—B of Fig. 12 of such intermediate diameter that it will support the $H_{21}$ component, but not the $H_{01}$ component. This supplies an additional element of adjustment through which the losses associated with the presence of the $H_{21}$ component in the converting chamber may be minimized.

Figure 1A:
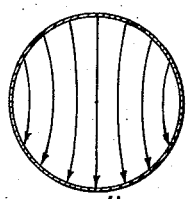
Figure 1B:
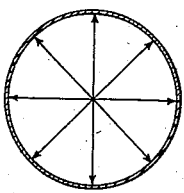
Figure 1C:
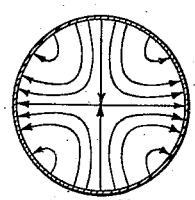
Figure 1D:
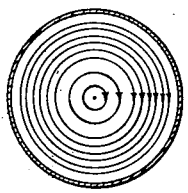
Figure 1E:
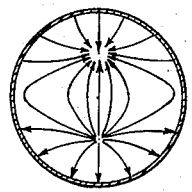
Figure 1F:
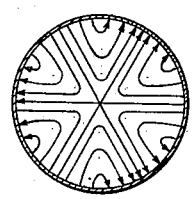

In Figs. 13 to 13C there is shown an assemblage which acts as an $H_{11} \rightleftarrows E_{11}$ converter using the septum shown in Fig. 8B. The principle of operation is identical to that of the converters already described. The grating 2 is composed of a diametral conducting plane and a group of approximate semicylindrical conductors arranged to lie along lines perpendicular to the lines of electromotive intensity in the $E_{11}$ wave, that is, the semi-cylindrical conductors constitute a system of surfaces orthogonal to the system of lines of electromotive intensity of the $E_{11}$ wave as represented in Fig. 1E. This arrangement will pass $E_{11}$, but reflect $H_{11}$ waves.

The arrangements of Figs. 9 to 13 show means of interchanging energy between an $H_{11}$ wave and each of the four next higher (from the point of view of cut-off) waves. Since the converters are two-way, it is obvious that by using two of them in tandem, or back-to-back, conversion between any pair can be effected. Thus in Fig. 14 there is shown a longitudinal section of a back-to-back converter system, converting from $E_{01}$ to $H_{11}$ and then to $H_{01}$ waves, or the reverse. Figs. 14A to 14F show cross-sections of the wave guide of Fig. 14 on the lines A—A, B—B, C—C, D—D, E—E and F—F, respectively. The diameter of the guide at the left is such as to support an $E_{01}$ wave, but this diameter is such as also to support an $H_{11}$ wave of the same frequency, as is apparent on reference to Fig. 1A. In order to prevent the transmission past this point of an $H_{11}$ wave in either direction, a grating which is made up of coaxial cylindrical conductors is introduced. Following this is the semicircular baffle 2. In the plane C—C spaced an appropriate distance from the baffle 2, the diameter of the guide is reduced sufficiently so that it no longer supports an $E_{01}$ wave, but will support an $H_{11}$ wave, the necessary change in diameter to accomplish this being obvious on reference to Figs. 1A to 1F. Thus the only component which can travel to the right from the baffle 2 is an $H_{11}$ component. In the plane E—E is a second semicircular baffle 3 oriented 90 degrees with respect to the baffle 2 and serving as a source of $H_{01}$ waves as well as other components. Preparatory to the conversion the diameter of the guide is enlarged in the plane D—D sufficiently so that it may support an $H_{01}$ wave. Reference to Fig. 4D indicates that other components are set up in addition to the $H_{01}$ wave and these are of such a nature that their transmission to the left is prevented by a grating of diametral conducting planes as shown in Fig. 14F and the only component which can then be propagated is the $H_{01}$ wave. Thus the system as a whole receives an incident $E_{01}$ wave, converts it to an $H_{11}$ wave and then makes a further conversion to an $H_{01}$ wave. Analysis will also show that this same system may receive an incident $H_{01}$ wave at the right and deliver an $E_{01}$ wave at the left. This is a substantial advantage, but evidently it introduces the possibility of reflected waves being transmitted towards the left, and for this reason impedance matching becomes of importance and such matching may be obtained by the introduction at suitable points of adjustable irises as shown in the figure.

It is to be understood, of course, that Fig. 14 is taken merely as one illustration of double conversion and a large number of other combinations are now clearly possible.

Figure 15:
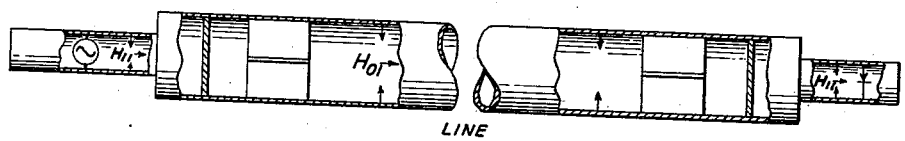

The converters can also be used in the manner indicated earlier, namely, to convert a wave as initially generated into a form which it is desired to transmit over a guide and finally back to a form adapted to the particular receiver chosen to absorb the energy. Such an assemblage is indicated in Fig. 15 where there is shown, schematically, a generator of $H_{11}$ waves, an $H_{11} \rightarrow H_{01}$ converter, a wave guide transmitting line, an $H_{01} \rightarrow H_{11}$ converter, and a receiver adapted to absorb an $H_{11}$ wave. Here again the various combinations of incident, intermediate and final wave are large and the choice would be determined by the particular problem in hand. In the figure the intermediate wave to be transmitted over a major portion of the transmission system is indicated as an $H_{01}$ wave, which would be particularly suitable for the reason that this type of wave has an especially low attenuation constant. In this figure also irises have been placed at various suitable points to assist in impedance matching.

Figure 16:
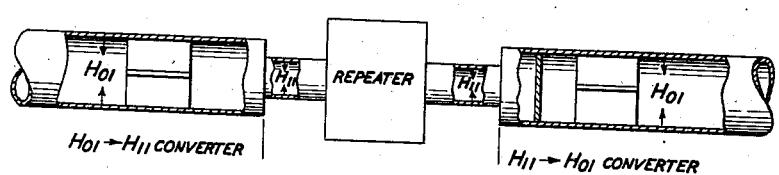

Still another application of the wave converters is disclosed in Fig. 16 in connection with a repeater between two sections of wave guide transmission line. It may be, for example, that the incoming wave from the left is of $H_{01}$ type and that the repeater is one peculiarly adapted for operating on an $H_{11}$ wave. The incoming $H_{01}$ wave is passed through an $H_{01} \rightarrow H_{11}$ converter. The resulting $H_{11}$ wave is set through the $H_{11}$ amplifier and then the amplified $H_{11}$ wave is converted back to an $H_{01}$ wave and sent on its way.

Figure 17:
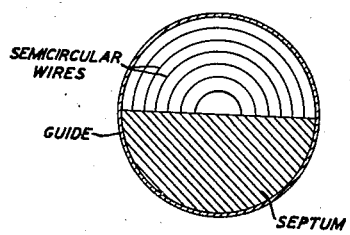
Figs. 17 and 18 represent modified converter baffles.
Figure 18:
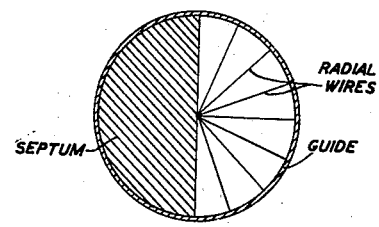

Figs. 3 and 4 show how a semicircular conducting baffle inserted in the path of an $H_{11}$ wave yields in the first case an $E_{01}$ source and in the second an $H_{01}$ source. In an $E_{01}$ wave there are no circularly directed electromotive intensities, but the electromotive intensity in the wave front is entirely radial as shown in Fig. 1B and conversely for an $H_{01}$ wave. The efficiency of the semicircular septum as a converter can be increased, thereby lessening the duty on the gratings, by modifying the semicircular element in the manner of Figs. 17 and 18. Fig. 17 shows a semicircular septum with an attached grating composed of semicircular wires attached to the septum. This arrangement is for an $H_{11} \rightarrow E_{01}$ converter, for the wires serve to diminish the amplitude of the fictitious $H_{11}$ and $H_{21}$ sources, thus increasing the amplitude of the $E_{01}$ source. Similarly in Fig. 18, in which radial wires are attached to the semicircular septum, the radial wires discriminate against the transmission of the virtual $H_{11}$ and $H_{21}$ sources, thus increasing the efficiency of the device as an $H_{01}$ source.

At times it will be desirable to convert from one type to another type of wave, but direct conversion from one to the other may be difficult. In such cases, one may convert from the incident type to an intermediate type for which conversion is readily obtained, so choosing this intermediate type that conversion from it to the desired type is readily obtained.

This invention has been described primarily in terms of some of the simpler forms of waves, but it is apparent that it may be applied to other types of waves for other types of conversion. All such variations must be understood, however, as coming within the purview of this invention as set forth in the following claims.

What is claimed is:

1. In a dielectric wave guide system comprising a wave guide and a generator of dielectrically guided waves of a definite type associated therewith, the method of converting from the incident type of wave to another type which consists in introducing in the wave path a generator excited by the incident wave to produce a plurality of new types of waves, combining the incident wave and the newly generated waves and transmitting the resultant.

2. In a dielectric wave guide system comprising a wave guide and a generator of dielectrically guided waves of a definite type associated therewith, the method of converting from the incident type of wave to another type which consists in introducing in the wave path a generator excited by the incident wave to produce a plurality of new types of waves, combining the incident wave and the newly generated waves, suppressing undesired components of the resultant wave and transmitting the remainder.

3. In a dielectric wave guide system, a wave guide, a generator of dielectrically guided waves of a definite type connected thereto, and means associated with the wave guide in the wave path for generating wave components of a plurality of different types of waves and arranged to permit combination of the incident and the newly generated waves.

4. In a dielectric wave guide system, a wave guide, a generator of dielectrically guided waves of a definite type connected thereto, and a barrier in the wave path adapted to serve as a generator of new types of waves and arranged to permit combination of the incident and the newly generated waves.

5. In a dielectric wave guide system, a wave guide, a generator of dielectrically guided waves of a definite type connected thereto, and a conducting barrier in the wave path adapted to serve as a virtual generator of new types of waves and arranged to permit combination of the incident and the newly generated waves.

6. In a dielectric wave guide system, a wave guide, a generator of dielectrically guided waves of a definite type connected thereto, and a wave type converter comprising a conducting barrier over a portion of the cross-section of the wave guide for introducing new types of waves, the form of the barrier being such that the newly generated waves when combined with the incident wave yield a desired new type to be transmitted over the wave guide.

7. In a dielectric wave guide system, a wave guide, a generator of waves of a definite type connected thereto, a wave type converter comprising a conducting barrier over a portion of the cross-section of the wave guide for introducing a plurality of new types of waves, the form of the barrier being such that the newly generated waves when combined with the incident wave yield a new resultant wave with components of different types, and means in the wave path to suppress undesired components of the resultant.

8. In a dielectric wave guide system, a wave guide, a generator of dielectrically guided waves of a definite type connected thereto, and a conducting physical barrier providing a sharp discontinuity in the wave path, the barrier being short compared to the wave-length and adapted to serve as a virtual generator of new types of waves.

9. In a dielectric wave guide system, a wave guide, a generator of dielectrically guided waves of a definite type connected thereto, and a conducting physical barrier providing a sharp discontinuity in the wave path, the barrier being short compared to the wave-length and adapted to serve as a virtual generator of new types of waves and arranged to permit combination of the incident and the newly generated waves.

10. In a dielectric wave guide system comprising a wave guide and a generator of waves of a definite type associated therewith, the method of signaling which comprises a plurality of conversions each consisting of a conversion from one type of dielectrically guided wave to another.

11. In a dielectric wave guide system, a wave guide, a generator of waves of a definite type connected thereto, and a wave type converter comprising a semicircular baffle over a portion of the cross-section of the tube for introducing new types of waves.

12. In a dielectric wave guide system, a wave guide, a generator of waves of a definite type connected thereto, and a wave type converter comprising a conducting semicircular baffle inserted in the wave guide and serving as a virtual source of a plurality of different types of waves.

13. A combination of claim 12 characterized by the fact that there are supplemental means associated with the virtual source for discriminating against the transmission of undesired components of waves.

14. A combination of claim 12 characterized by the fact that there are supplemental means associated with the virtual source for discriminating against the transmission of undesired components of waves, said means consisting of a plurality of conducting cylinders to bar transmission to all waves except those with radial electric field.

15. A combination of claim 12 characterized by the fact that there are supplemental means associated with the virtual source for discriminating against the transmission of undesired components of waves said means consisting of a plurality of conducting diametral planes to bar transmission to all waves except those with circular electric field.

16. In a dielectric wave guide system, a wave guide, a generator of $H_{11}$ type of waves, and means for converting said wave to a different type consisting of a semicircular conducting baffle with the diametral line of the semicircle at right angles to the transverse electromotive intensity of the incident $H_{11}$ wave.

17. In a dielectric wave guide system, a wave guide, a generator of $H_{11}$ type of waves, and means for converting said wave to a different type consisting of a semicircular conducting baffle with the diametral line of the semicircle parallel to the transverse electromotive intensity of the incident $H_{11}$ wave.

18. In a dielectric wave guide system, a wave guide, a generator of waves of a definite type connected thereto, and a wave type converter comprising a plurality of conducting sectors transverse to the guide and covering a portion of the wave guide section.

19. In a dielectric wave guide system, a wave guide, a generator of waves of a definite type connected thereto, and a wave type converter consisting of a conducting zone extending over a portion of the transverse section of the guide.

20. In a dielectric wave guide system, a wave guide, a generator of waves of a definite type associated therewith, and two wave type converters placed back-to-back in said wave guide, one consisting of a semicircular conducting member mounted in the guide and the other consisting of a similar semicircular conducting member oriented 90 degrees with respect to the first.

21. The combination of claim 20 characterized by the fact that the diameter of the wave guide is altered at certain points to suppress undesired components generated at the wave converters.

22. The combination of claim 19 characterized by the fact that the conducting member consists of two polar zones.

23. The combination of claim 19 characterized by the fact that the conducting member consists of an equatorial zone.

24. In combination, a wave guide comprising a metallic pipe, means for transmitting through the interior of said pipe electromagnetic waves of such field pattern that the guide presents the attenuation characteristic of a high-pass filter, and a conductive diaphragm in the path of said waves having an aperture of such configuration as to convert waves of incident type to waves of another type.

25. In combination, a guide for high frequency electromagnetic waves consisting essentially of a metallic pipe, and means the axial length of which is negligible compared with the length of said waves for converting said waves of an incident type to waves of at least one other type.

26. In combination, a hollow uniconductor guide for electromagnetic waves and a localized impedance element in the path of said waves so configured as by distortion of the characteristic field pattern of waves incident upon it to produce a substantial component of waves of different characteristic field pattern.

27. In combination, a wave guide comprising a metallic pipe and an enclosed dielectric medium, means for launching high frequency electromagnetic waves for transmission through said guide, and a metallic baffle extending transversely through said dielectric medium, said baffle being so configured relative to the characteristic field pattern of said waves as to give rise to waves of different characteristic field pattern, the waves on at least one side of said baffle being of such nature that the guide presents to them the characteristics of a high-pass filter.

28. In combination, a dielectric guide comprising a dielectric path and a metallic sheath therefor, means for launching dielectrically guided waves of a first type for transmission through said guide, and a conductive barrier blocking off a substantial portion of said dielectric path such that said waves are converted at least in part to dielectrically guided waves of a second type.

29. In combination, a metallic pipe guide for the transmission of electromagnetic waves of a given type at frequencies above the cut-off frequency thereof, and a metallic septum within said guide having one or more apertures for the passage of said waves, the configuration of said septum being so related to the characteristic field pattern of said waves that the portion of the incident field appearing at said aperture or apertures is resolvable into a plurality of waves of different types.

30. In combination, a guide comprising a metallic pipe for the transmission of dielectrically guided waves of a certain type, and means within said pipe adapted to convert said waves into waves of a plurality of different types, the cut-off frequency of at least a portion of said guide in the vicinity of said means being greater for one of said different types than the frequency of said waves, whereby a greater proportion of the incident wave power is converted into waves of another of said different types.

31. In a dielectric guide system, an incoming wave guide, an outgoing wave guide, and means near their junction for converting waves of the incident type to waves of another type, the said incoming wave guide having a cut-off frequency for the waves of said other type that is too high to support their transmission.

32. A combination in accordance with claim 31 in which said converting means is spaced a distance from said junction that is optimum for the launching of waves of said other type.

33. A wave guide comprising a metallic pipe for the transmission of dielectrically guided waves, a metallic baffle in said pipe for converting waves from an incident type to another type, and filtering means for purifying the converted waves of said other type, said baffle and said filtering means being so spaced apart as to minimize reflection of the incident waves.

34. A metallic pipe guide for the transmission of dielectrically guided waves, a transverse metallic baffle within said guide adapted to convert waves from an incident type to another type, and a conductive screen cooperating with said baffle for the selective transmission of waves of said other type.

35. In a system for the transmission of dielectrically guided waves, the method of wave type conversion which comprises the successive steps of converting the incident type to an intermediate type having the lowest cut-off frequency, eliminating all types except said intermediate type, and converting said intermediate type to a third type.

36. In a metallic pipe wave guide, a multiple converter comprising means for converting waves of a first type to waves of a plurality of types including the $H_{11}$ type, a length of guide the transverse dimensions of which are so restricted as to preclude transmission of any of said plurality of types except said $H_{11}$ type, and means for converting the $H_{11}$ waves transmitted through said length of guide into waves of another type.

ARNOLD E. BOWEN.